(12) United States Patent
Finlan et al.

(10) Patent No.: US 8,387,161 B2
(45) Date of Patent: Feb. 26, 2013

(54) SCANNING PROBE MICROSCOPE

(75) Inventors: Martin F. Finlan, Doncaster (GB); Shelley J. Wilkins, Doncaster (GB)

(73) Assignee: Orbital Instruments Limited, South Yorkshire (GB)

( * ) Notice: Subject to any disclaimer, the term of this patent is extended or adjusted under 35 U.S.C. 154(b) by 83 days.

(21) Appl. No.: 12/921,832

(22) PCT Filed: Mar. 12, 2009

(86) PCT No.: PCT/GB2009/050238
§ 371 (c)(1),
(2), (4) Date: Sep. 10, 2010

(87) PCT Pub. No.: WO2009/112861
PCT Pub. Date: Sep. 17, 2009

(65) Prior Publication Data
US 2011/0035849 A1   Feb. 10, 2011

(30) Foreign Application Priority Data

Mar. 12, 2008   (GB) .................................. 0804629.4

(51) Int. Cl.
*G01Q 60/24*   (2010.01)
(52) U.S. Cl. ............................................. 850/33; 850/21
(58) Field of Classification Search ............... 850/21, 850/30, 31, 33, 43, 46, 47
See application file for complete search history.

(56) References Cited

U.S. PATENT DOCUMENTS

| 4,939,363 A | 7/1990 | Bando et al. |
| 2002/0124427 A1 | 9/2002 | Nishimura et al. |
| 2004/0040373 A1 | 3/2004 | Saito |
| 2004/0206165 A1* | 10/2004 | Minne et al. .................... 73/105 |
| 2005/0208554 A1* | 9/2005 | Chan et al. ........................ 435/6 |
| 2007/0157712 A1 | 7/2007 | Amakusa |

FOREIGN PATENT DOCUMENTS

| EP | 0 397 416 | 11/1990 |
| EP | 0 397 496 | 11/1990 |
| WO | 2006/138697 | 12/2006 |
| WO | 2007/094365 | 8/2007 |

OTHER PUBLICATIONS

A new atomic force microscope probe with force sensing integrated readout and active up, Onaran et al., Review of Scientific Instruments, vol. 77, pp. 023501-1-023501-7, (2006).

A flat type probe sensor using PZT thin film vibrator, Kanda et al., Sensors and Actuators, vol. 83, pp. 67-75, (2000).

Atomically-resolved imaging by frequency-modulation atomic force microscopy using a quartz length-extension resonator, An et al., Applied Physics Letters, vol. 87, pp. 133114-1-133114-3, (2005).

* cited by examiner

*Primary Examiner* — Michael Maskell
*Assistant Examiner* — Hanway Chang
(74) *Attorney, Agent, or Firm* — Carmody & Torrance LLP (57) ABSTRACT

An elongate probe (50) for use in probe microscopy comprises a module (51) provided between a probe tip (53) and a driver (52). In use the driver (52) applies oscillations to the module (51) which are transmitted by the module to the tip (53). With the probe tip (53) positioned close to the surface of a sample, any phase variance in the oscillation of the tip with respect to the driving oscillation is representative of an interaction between the tip and the sample surface. The elongate arrangement of the probe (50) is particularly beneficial when used to probe samples which require a liquid environment.

10 Claims, 11 Drawing Sheets

SCANNING PROBE MICROSCOPE

CROSS REFERENCE TO RELATED APPLICATIONS

This application is a National Stage application of International Application No. PCT/GB2009/050238, filed Mar. 12, 2009, the subject matter of which is incorporated by reference in its entirety.

FIELD OF THE INVENTION

This invention relates to high resolution imaging of a surface using a scanning probe microscope (SPM). In particular, this invention relates to a probe for such a microscope.

BACKGROUND TO THE INVENTION

The Atomic Force Microscope (AFM) has been widely used to image surfaces at a resolution of fractions of a nanometer. The AFM typically comprises a cantilever having a sharp tip at one end that is used to scan the sample surface. When the tip is brought into proximity with the surface, forces between the tip and the sample lead to deflection of the cantilever. Measurement of this deflection is used to create an image of the surface. To alleviate the risk that the tip collides with the surface during scanning, which may cause damage, a feedback mechanism is typically employed to maintain a constant distance between the tip and the surface.

In order for the tip to be close enough to the surface for short-range forces to become detectable, while preventing the tip from sticking to the surface, the AFM cantilever is typically operated in "tapping" mode. This also avoids damage caused by dragging of the sharp tip across the surface in "contact" mode AFM. In tapping mode, the cantilever is oscillated such that during each cycle the tip comes in contact with the surface, and a restoring force provided by the cantilever detaches the tip from the surface. This is usually achieved by attaching a piezoelectric block to the other end of the cantilever, remote from the tip, which drives the cantilever assembly up and down at its resonant frequency, usually at frequencies of up to tens of kHz.

Figure 1:
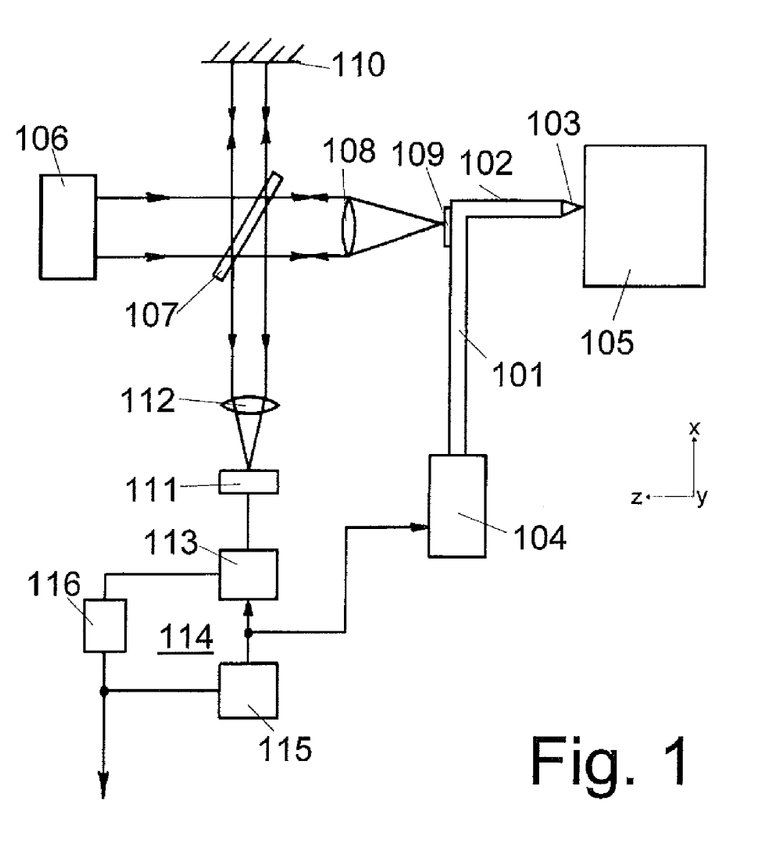
FIG. 1 shows a block diagram of an optical interferometric cantilever AFM system of the prior art.

Tapping mode AFM generally relies upon differentiation of the phase of the tip from that of the driver. A typical AFM setup is shown in FIG. 1 and described in EP0397496A. A compliant cantilever 101 is attached at one end to a probe 102 having a sharp tip 103, and at its other end to a driver 104 for oscillating the probe in the z direction. Means (not shown) are provided for x-y scanning of the probe 102 across the sample surface 105. Deflection of the cantilever in the z direction is measured by optical interferometry. The output of a laser 106 is directed via a beam splitter 107, set at 45 degrees to the beam axis, and a lens 108 to a reflecting surface 109 provided on the probe end of the cantilever 101 and separately to a plane mirror 110. Light incident on the plane mirror 110 is reflected back to the beam splitter 107, and light incident on the reflecting surface 109 is reflected back to the beam splitter 107. The two reflected beams meet and interfere at the beam splitter 107 and the resultant fringe pattern is directed to a light detector 111 via lens 112. The electrical output of the light detector 111 is applied to one input of a phase detector 113 forming part of a phase locked loop 114. The other input to the phase detector 113 is taken from a loop voltage controlled oscillator (VCO) 115. The output from the VCO 115 is also applied to the driver 104. The control voltage for the VCO is developed from the output of the phase detector 113 by means of a loop filter 116.

The tip 103 attached to, or integral with, the end of the cantilever 101 is deemed to have an egregious atom which interacts with the Van der Waals forces of the atoms of the sample surface 105. The compliance of the cantilever 101 allows a phase discrepancy to exist between the driver 104 and the tip as a result of such interaction. The detection of this discrepancy in the output from loop filter 116 is used to control the height of the tip 103, via a z height controller, at a constant distance from the surface 105 from which the contour is derived in a raster scan to produce a topographic x,y image of the surface.

Tuning the oscillator frequency of the VCO 115 to the resonant frequency of the cantilever assembly, in its free/unbiased state, improves sensitivity and noise performance. However, the amplitude and frequency of the oscillation in tapping mode AFM are clearly constrained by the resonant frequency and mechanical properties of the cantilever, leading to limited scan speeds. Harmonic operation is theoretically possible to increase scan speed, but virtual world modelling suggests that distortion and twisting of the cantilever occurs easily in this mode, particularly where the tip is influenced by lateral forces.

While tapping mode AFM has worked well enough in air, the effect of a liquid environment, as for electrochemical and live cell studies, is to lower the resonant frequency of the cantilever by a factor of five or more, and to introduce cavitation and turbulence into the liquid environment near the surface. The time taken to scan even a limited area is extended considerably and thermal fluctuations cause drifts in laser alignment.

In an article by A. G. Onaran, et al, entitled "A new atomic force microscope probe with force sensing integrated readout and active tip" published in Review of Scientific Instruments 77, 023501 (2006) an alternative to the conventional cantilever probe is described. The probe described in this article comprises a sharp probe tip provided on a micromachined optically reflective membrane, The membrane is, in turn, mounted on a transparent substrate incorporating a diffraction grating resulting in an integrated phase-sensitive structure. Thus, probe tip displacement is monitored by illuminating the diffraction grating and monitoring the intensity of the reflected diffraction orders. The tip of the probe is moved by electrostatic forces applied to the membrane with the transparent substrate as a rigid actuator electrode.

A further alternative to the conventional cantilever probe is described in an article by Toshu An, et al, entitled "Atomically-resolved imaging by frequency-modulation atomic force microscopy using a quartz length-extension resonator" published in Applied Physics Letters 87, 133114 (2005). This article describes the use of a quartz rod as a resonator to which a probe tip is attached. Shifts in the resonance frequency of the probe are representative of the interactive force between the probe tip and the sample surface and thus by applying a small oscillation amplitude to the resonator, characteristics of the surface of the sample may be imaged.

There is therefore a need in the art for an improved SPM to address at least some of the drawbacks evident in AFM.

SUMMARY OF THE INVENTION

According to a first aspect of this invention, there is provided a scanning probe microscope for topographical imaging of a surface, comprising an elongate probe having a longitudinal axis oriented substantially orthogonal to the surface, the probe having a tip, a driver and a compliant elastic module disposed between the driver and the tip, the driver being adapted to axially oscillate the tip.

According to a second aspect of this invention, there is provided a method for topographical imaging of a surface using the scanning probe microscope of the first aspect, comprising bringing the probe in proximity with the surface and driving the probe tip in axial oscillation.

In the absence of external forces acting on the tip, the tip will vibrate with a constant phase relationship to the driver. By bringing the probe into close proximity with the surface, any interaction of the tip with the surface, i.e. by virtue of Van der Waals forces or sticking, will change this mechanical phase relationship due to the compliance of the elastic module disposed between the tip and the driver, orthogonal to the surface. In the context of this document reference to the module being compliant is to be understood as reference to the module elastically deforming under the forces generally encountered in probe microscopy.

Detection of this change in phase relationship may be used to control the height of the tip, via a z height controller, at a constant distance from the surface from which the contour is derived in a raster scan to produce a topographic image of the surface. Due to the elimination of the cantilever used in AFM, raster scan speeds can be high enough to result in real time imaging capability, impossible to achieve using AFM. The upper limit of the frequency of operation will be determined by the resonant frequency of the elastic module. The tip oscillation may be user defined up to tens of thousands of kHz, three orders of magnitude greater than that for AFM.

Preferably, the elastic module has a tapering cross-section along its length towards the tip. In a preferred example of the present invention, the elastic module is an acoustic transformer of hyperbolic section. This transforms the high force, low amplitude motion of the driver into a low force, high amplitude motion at the tip, which can be better matched to the tip/surface interaction force levels.

The elastic module can take many forms and may be a spring, an elastomeric member or a fluid filled tube. The driver can also take many different forms and may include piezo-electric, magneto-constrictive or electromagnetic drive means. The principles of this invention are therefore far reaching and may be applied to a wide variety of probes, adapted for a similarly wide variety of uses.

Monitoring of the axial tip position is preferably by optical interferometry, in a similar way to that described above for AFM, using a laser source and an array of photodiodes. However, deflection of the tip can be measured by any sufficiently sensitive technique, e.g. tunnelling microscope, capacitance or inductance changes. For example, the position of the tip itself, or a ferromagnetic bead attached to it, could be assessed from signals from adjacently mounted inductors.

The SPM of this invention is far less constrained than cantilever AFM. In particular, imaging under liquid becomes less intrusive. The tip can be arbitrarily long, limited only by inertial considerations, with diameters as small as is consistent with mechanical stability, which makes possible imaging which cannot be achieved using cantilever AFM. For example, this invention allows imaging with minimal disturbance in liquids. Not only does this invention lead to an expansion of the areas in which SPM can be used but also enables the principles of this invention to be used in conjunction with both optically inverted and non-inverted microscopy techniques to produce combination images that have not previously been possible, at the micro, nano and atomic scale.

For example, the SPM of this invention can be combined with Near Field Scanning Optical Microscopy (SNOM), Fluorescence Resonance Energy Transfer (FRET), Total Internal Reflection Microscopy (TIRF), Surface-Enhanced Raman Scattering (SERS), Scanning Ion Conductance Microscopy (SICM), Surface Plasmon Resonance (SPR), or Magnetic Force Microscopy (MFM).

The SPM of this invention preferably includes an array of such probes, each probe being associated with an area of the sample surface. The probes are preferably moved simultaneously across the surface, such that each probe scans across its associated area. Subdivision of the surface in this manner leads to reduced scan times.

BRIEF DESCRIPTION OF THE DRAWINGS

Preferred examples of the present invention will now be described with reference to the accompanying drawings, in which.

DETAILED DESCRIPTION

The SPM of this invention differs from the exemplary optical interferometric cantilever AFM system shown in FIG. 1 in that the driven cantilever and attached tip is replaced with an elongate probe having a longitudinal axis oriented substantially orthogonal to the sample surface. The probe has a tip, a driver and a compliant elastic module disposed between the driver and the tip. Thus, the SPM employs a non-cantilever probe.

Figure 2:
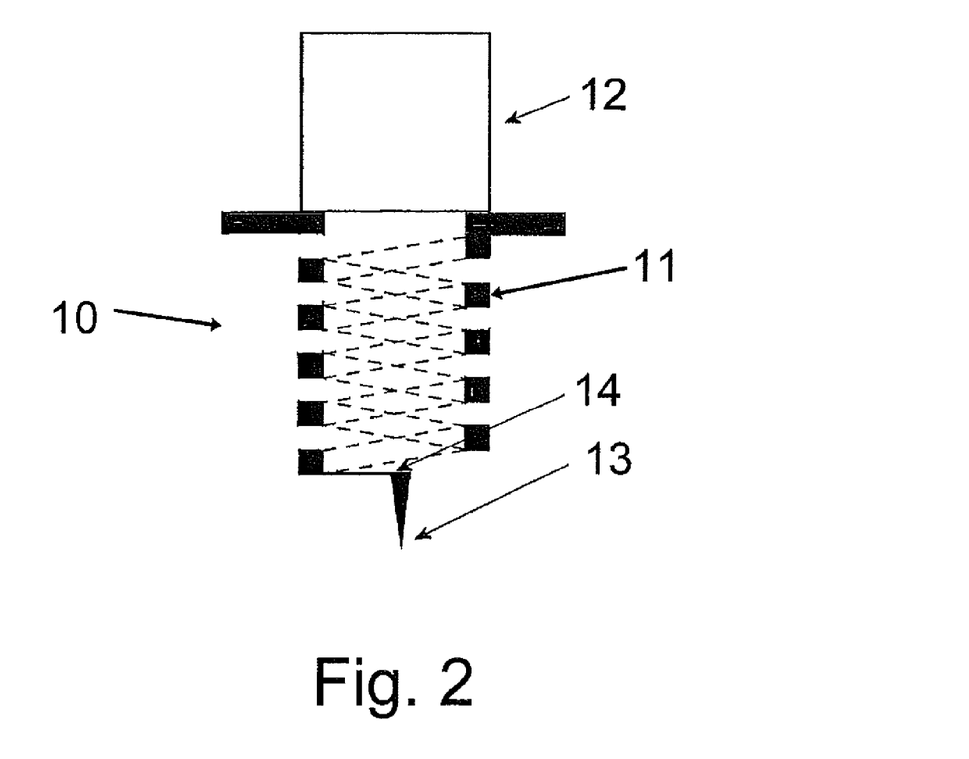
FIG. 2 shows a first example of a probe of an SPM of this invention.

In the first example of this invention, shown in FIG. 2, the probe 10 includes a helical coil spring 11, of which one end is attached to a driver 12 and the other end is attached to a sharp tip 13. The driver 12 is adapted to mechanically oscillate the spring 11, as the compliant elastic module, along the longitudinal axis of the spring 11 and is positioned at the opposite end of the compliant elastic module to the sharp tip 13, symmetric about the longitudinal axis of the module. The tip 13 is adapted to interact with a sample surface.

The low forces involved in the interaction between the tip 13 and the sample surface, at the pico newton level, suggest that the probe 10 will be on the micro scale, and would be most readily micro-machined from materials such as, but not limited to, silicon, silicon nitride, aluminium nitride, or some alloys.

The probe 10 further includes a mirror 14 acting as a reflecting surface for an optical interferometric tip monitoring system. In other words, the mirror 14 is analogous to the reflective surface 107 of FIG. 1. The mirror 14 conveniently acts as a radial supporting bridge between the helical spring 11 and the axially disposed tip 13.

Figure 3:
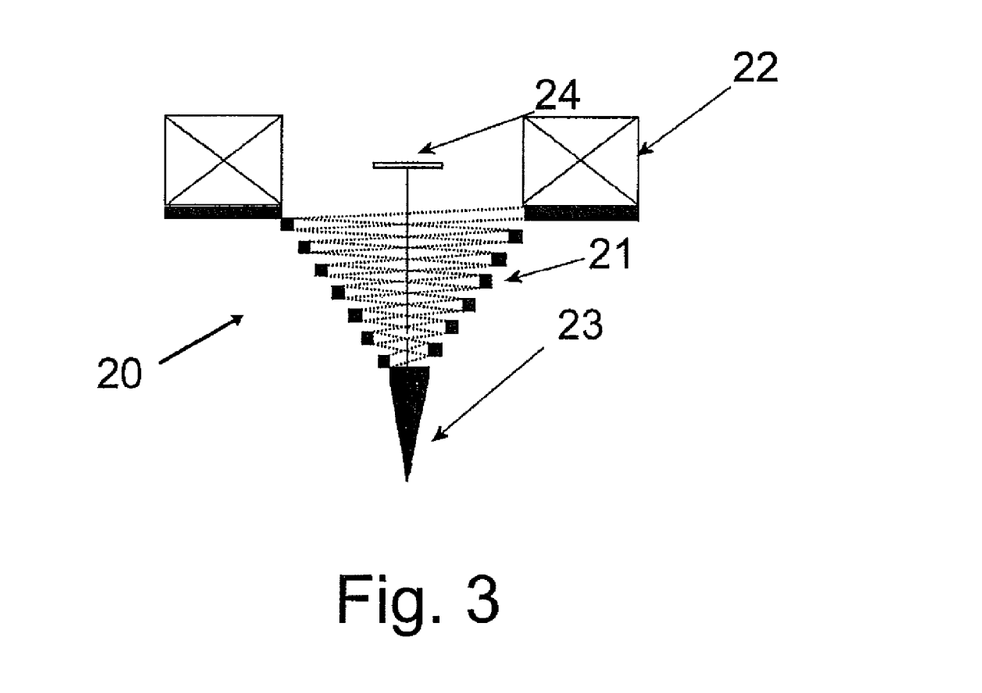
FIG. 3 shows a second example of a probe of an SPM of this invention.

Stability of the probe may be improved and micro-machining of the spring more readily realised by adapting the spring geometry. FIG. 3 shows the probe 20 of the second example of this invention. The probe 20 includes a conical spiral spring 21, attached between a driver 22 and a tip 23. The spring 21 may be formed as a flat spiral, deformed into the conical form. The probe further includes a mirror 24 supported by the tip 23 and acting as the reflecting surface. This geometry would more readily be capable of being made in an array form, with micro-mirror readout of the tip height change.

Figure 4:
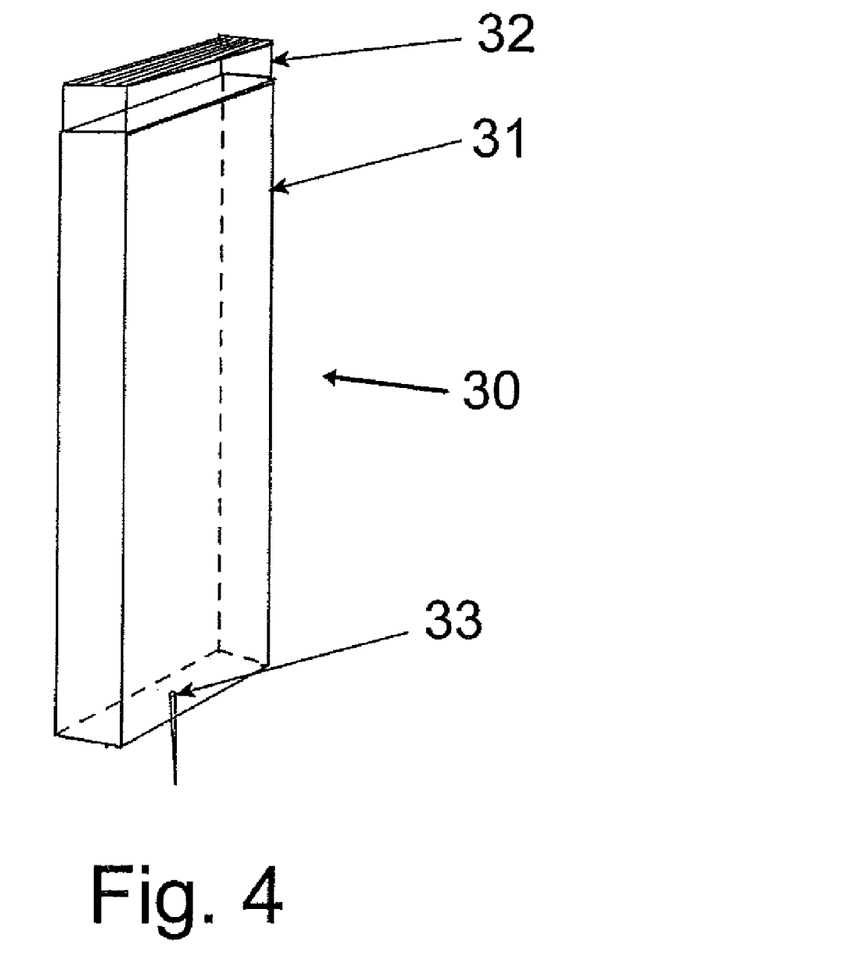
FIG. 4 shows a third example of a probe of an SPM of this invention.

In the third example of this invention, shown in FIG. 4, the probe 30 includes an elastomeric block 31 as the compliant elastic module, shaped as a rectangular parallelepiped, of which one end is attached to a driver 32 and the other end is attached to a sharp tip 33. The block 31 may be made, for example, of rubber material. In order to optically monitor probe tip height changes, the driver 32 may include an aperture (not illustrated) for use in combination with an optical fibre to monitor the probe tip.

Figure 5:
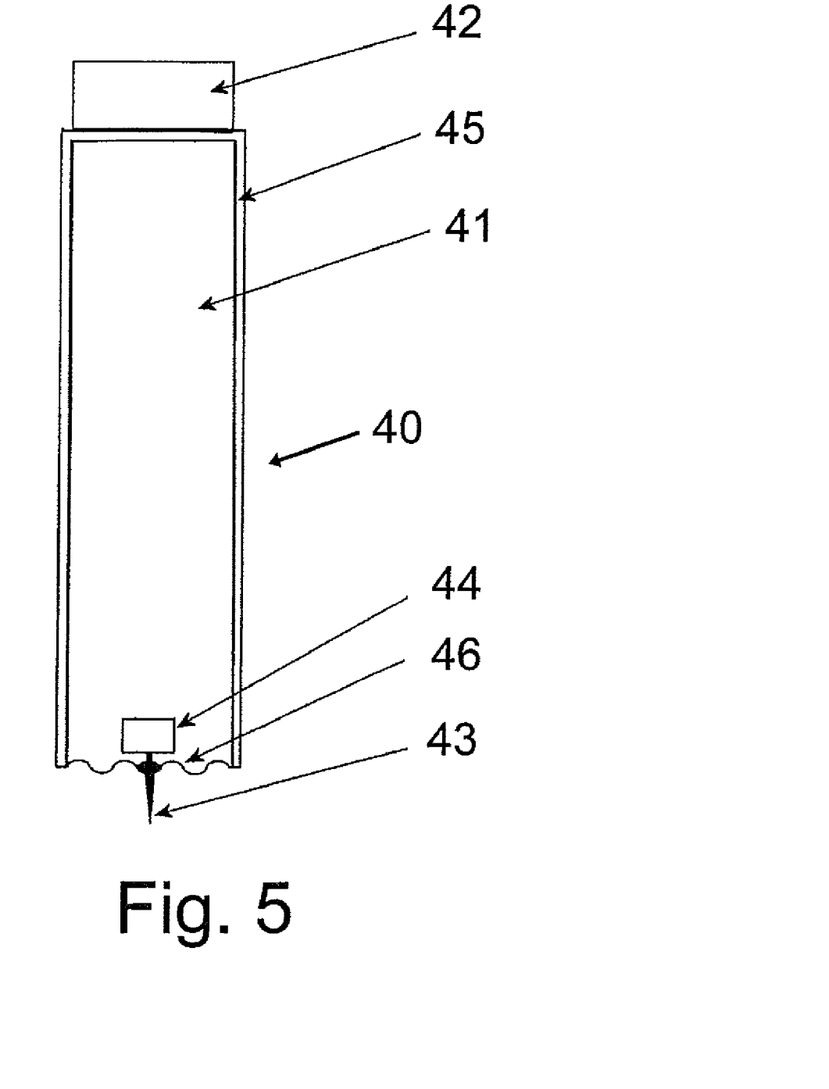
FIG. 5 shows a fourth example of a probe of an SPM of this invention.

In the fourth example of this invention, shown in FIG. 5, the probe 40 includes a compressible elastic fluid 41 contained within a cylindrical vessel 45 having a sealed upper end attached to a driver 42. The lower end of the cylindrical vessel 45 is closed by a membrane or piston 46, to which a sharp tip 43 is attached. The cylindrical vessel 45 and the membrane/piston 46 together form the compliant elastic module of this invention. Attached to the membrane/piston 46 or the tip 43 is a reflecting surface 44. The driver 42 is adapted to drive the cylindrical vessel 45 in axial oscillation, which moves the membrane/piston to which the tip 43 is attached, up and down.

As can be seen from the first through fourth examples above, the compliant elastic module can take many different shapes and forms. However, there are advantages to forming the compliant elastic module as an acoustic transformer, usually of hyperbolic section, between the driver and the tip. This transforms the high force, low amplitude motion of the driver into a low force, high amplitude motion at the tip, which can be better matched to the tip/surface interaction force levels.

Figure 6:
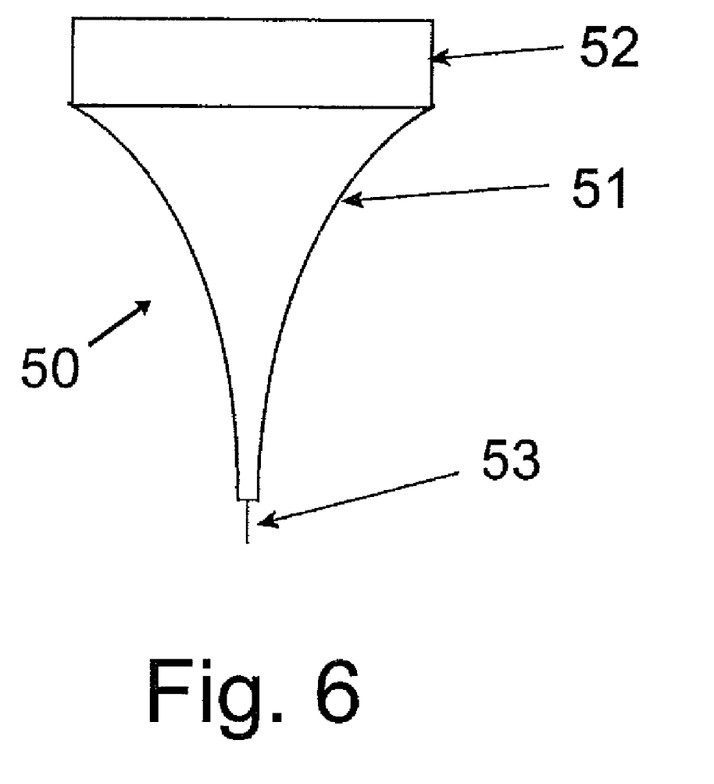
FIG. 6 shows a fifth example of a probe of an SPM of this invention.

One such geometry is shown in FIG. 6, which represents the fifth example of this invention. The probe 50 includes a compliant elastic module 51 between a driver 52 and a sharp tip 53, the elastic module being made entirely of elastomer and having a hyperbolic section, such that the elastic module 51 tapers towards the tip end.

Figure 7:
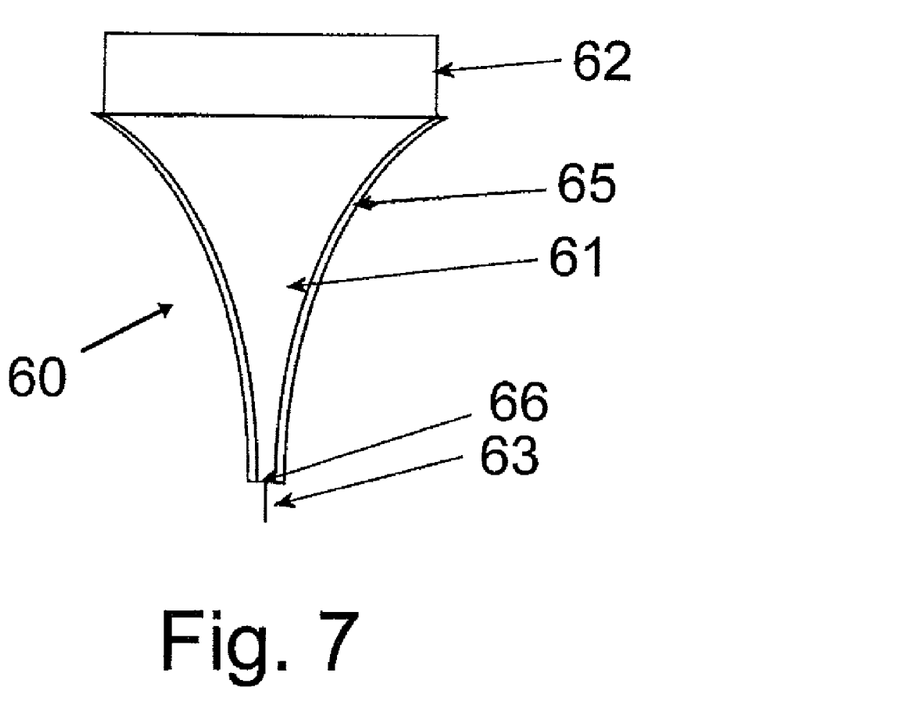
FIG. 7 shows a sixth example of a probe of an SPM of this invention.

In the sixth example of this invention, shown in FIG. 7, the hyperbolic geometry is achieved with a fluid assembly, instead of the elastomer of the fifth example. The probe 60 includes a compressible elastic fluid 61 contained within a hyperbolic section vessel 65 having a sealed upper end attached to a driver 62. The lower end of the hyperbolic section vessel 65 is closed by a membrane or piston 66, to which a sharp tip 63 is attached. The fluid filled hyperbolic transformer of the sixth embodiment is therefore based upon the principles of the fourth and fifth examples.

Figure 8:
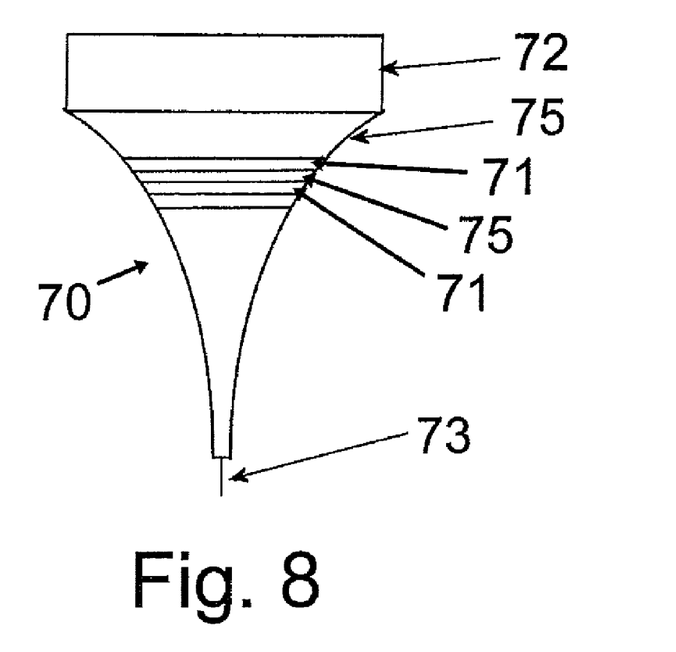
FIG. 8 shows a seventh example of a probe of an SPM of this invention.

The entirely elastomeric component of the fifth example could instead be formed as a laminated structure to change the characteristics of the compliant elastic module. One such structure is shown in FIG. 8, which represents the seventh example of this invention. The probe 70 includes a hyperbolic transformer made of one or more laminations of elastomer 71 and solid material 75, between a driver 72 and a sharp tip 73.

The driver, as in all the above examples can be, but is not restricted to, piezo-electric, magneto-constrictive, or electro-magnetic. In all cases it will be apparent that the compliant elastic module is provided solely to act as an oscillation bridge, transmitting oscillations to the probe tip which have been applied to the module externally by a separate driver. The compliant elastic module does not generate its own oscillations and instead requires the oscillations to be externally applied.

In all of the above examples, the materials can be transparent to aid in the transmission of light for optical monitoring of the axial tip position. The probe may include a reflective surface, as shown in the above examples, for use in optical interferometric monitoring of the axial tip position similar to the setup described for cantilever AFM with reference to FIG. 1.

Alternatively, the optical SiGNUM™ system sold by Renishaw plc, Wotton-under-Edge, Gloucestershire, UK, in which a grating is projected on to a grating attached to, or adjacent, the probe tip may be used to give positional information accurate to the nm region which is needed for this application. The axial position of the tip itself, or a ferromagnetic bead attached to it, could alternatively be assessed from signals from adjacently mounted inductors.

The mechanical phase change which will develop between motion of the tip and the driver when Van der Waals forces come into play, when the tip is brought into proximity with the sample surface, is used in a feedback loop to control the height of the probe tip relative to the surface to maintain the tip at a constant distance from the surface from which the contour is derived from combining a series of height adjustments collected during a raster scan to produce a topographic image of the surface.

A conventional three-axis piezo system such as that typically employed in cantilever AFM systems may be used to control movement of the probe scanwise in the x and y directions and also in the z height direction.

The upper limit to the frequency of operation will be determined by the resonant frequency of the compliant elastic module, be it elastomer or fluid filled tube. This would be when a standing wave is set up within it, and is a function of the velocity of sound within the fluid or elastomer. This would be frustrated in the hyperbolic geometries.

If the fluid is air, the velocity of sound at 20 degrees Celsius is 300 m/s, ie a standing wave would be set up at about 10 kHz for a fluid filled tube 1.5 cm long. For a 1.5 cm long elastomeric block, the sound velocity would be 1800 m/s, and so resonance would be 60 kHz.

Experimental Results

Several formers were machined in aluminium alloy into acoustic transformer shapes with base diameters ranging from less than 10 mm to more than 20 mm. These were used in conjunction with a two part silicone based elastomer to create moulds. Vacuum degassed heat curable silicone rubber was poured into the moulds to create compliant elastic modules in the form of acoustic transformer modules covering a range of sizes and with differing shore hardness values. One source of these elastomeric materials is Nusil Silicone Technology (USA). Two part liquid silicone elastomers LS1-6941 (Type A durometer 53), R21-2615 (Type A durometer 75) and R2620 (Type A durometer 63) were typical elastomers used in the viability stage of testing.

The base of each acoustic transformer module was coupled to a piezoelectric driver. Accoustic waves generated using a signal generator travelled through the module to its tip. A signal receiver was positioned at the tip of the module which converted the motion into an electric signal. Both the input and output waveform signals were compared directly using a picoscope to assess the phase difference when the compliant elastomeric module was either in contact or out of contact with a surface.

Figure 9:
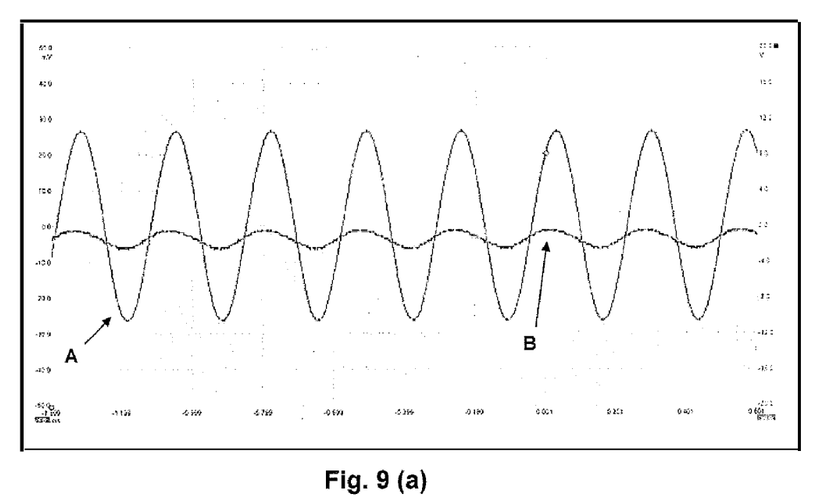
FIGS. 9(a), 9(b), 10(a), 10(b), 11(a) and 11(b) illustrate the phase differences generated using three sample probes in accordance with the present invention at a range of driving frequencies.
Figure 10:
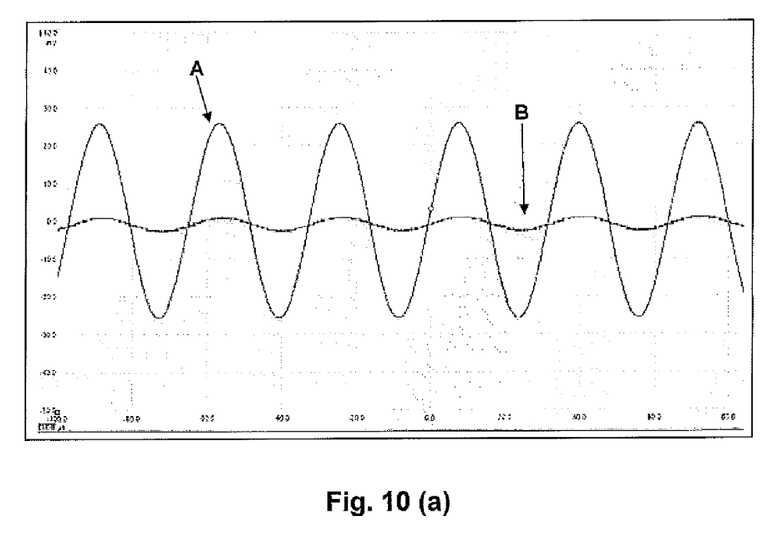
Figure 11:
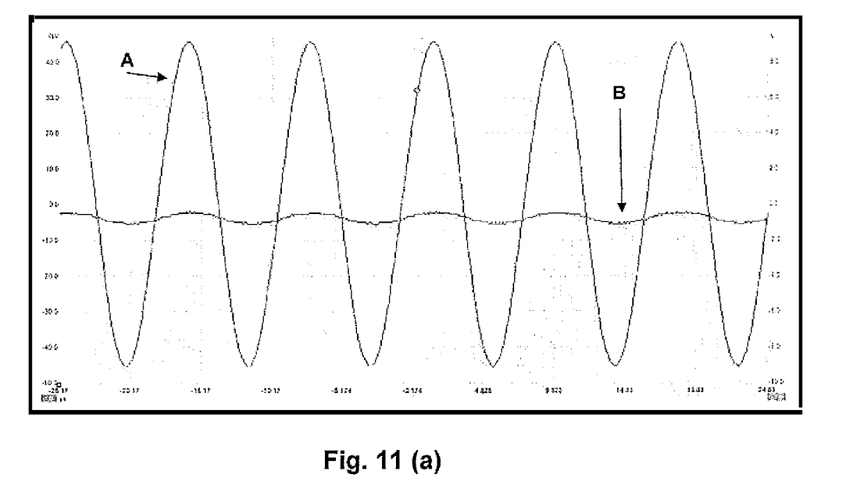

Some of the curves generated in this way are shown in FIGS. 9 to 11. The figures illustrate the phase difference that can be generated with different input frequencies and the amplitude variation in the output signal when the tip is in contact with a surface. These variations in the signal will be used to drive the module at a constant distance from the surface.

FIG. 9(a) illustrates the measured response of a conical elastomer made of compound EC13 (very elastic) when driven at 3.7 kHz and with no contact with the motion detector. FIG. 9(b) illustrates the measured response of the same conical elastomer at the same frequency but with the tip of the elastomer in contact with the motion detector. In each case line A represents the input signal, line B the output signal.

FIG. 10(a) illustrates the measured response of a conical elastomer made of compound EC07 (very elastic) when driven at 31.2 kHz and with no contact with the motion detector. FIG. 10(b) illustrates the measured response of the same conical elastomer at the same frequency but with the tip of the elastomer in contact with the motion detector. In each case line A represents the input signal, line B the output signal.

FIG. 11(a) illustrates the measured response of a conical elastomer made of compound EC05 (high durability) when driven at 115 kHz and with no contact with the motion detector. FIG. 11(b) illustrates the measured response of the same conical elastomer at the same frequency but with the tip of the elastomer in contact with the motion detector. In each case line A represents the input signal, line B the output signal.

Imaging Modes

The SPM of this invention can be operated in dynamic mode or "tapping" mode by which the tip is oscillated at a user defined nominal frequency and not limited to the resonance frequency of a cantilever as in AFM. The frequency range can therefore be in the region of 0 to tens of thousands of kHz. Thus, with the present invention real time/video rate imaging of a sample is achievable.

The SPM of this invention can also be operated in "altitude mode" in which a line is raster scanned in tapping mode, as above, and subsequently by a repeated raster scan following the contours at a predetermined distance above the surface for, but not limited to, electrochemical, magnetic and conductance measurements.

Applications

The tip can be arbitrarily long, limited only by inertial considerations, with diameters as small as is consistent with mechanical stability, which makes possible imaging which cannot be achieved using cantilever AFM. For example, this invention allows imaging with minimal disturbance in liquids. Not only does this invention lead to an expansion of the areas in which SPM can be used but also enables the principles of this invention to be used in conjunction with both optically inverted and non-inverted microscopy techniques to produce combination images, at the micro, nano and atomic scale.

For example, the SPM of this invention can be combined with Near Field Scanning Optical Microscopy (SNOM), Fluorescence Resonance Energy Transfer (FRET), Total Internal Reflection Microscopy (TIRF), Surface-Enhanced Raman Scattering (SERS), Scanning Ion Conductance Microscopy (SICM), Surface Plasmon Resonance (SPR), or confocal fluorescence.

Isolating Enclosures

Another feature of the use of long tips is the ease with which operation in an isolating enclosure can be set up, giving the option of scanning not only in air and aqueous media, but also in heterogeneous media-heterogeneous imaging mode.

Two phase or sequential imaging in, e.g. air/fluid environments can be done to reveal the effects of one, then the other on the properties of a surface both for biological and electrochemical studies.

Disposing the SPM probe in a humidified enclosure would enable, e.g. accelerated corrosion studies, and the deterioration of drugs or organic/inorganic crystals to be examined.

Where the SPM probe is enclosed in an inert atmosphere or even a vacuum, oxidisable species may be studied to image directly surfaces which at present need Scanning Electron Microscopy (SEM) or Transmission Electron Microscopy (TEM). The latter rely on the deposition of metallic coatings to image organic materials, inevitably compromising the structures.

Magnetic Field Measurements

The probe tip may be magnetic or magnetised so that a magnetic field image can be delivered by Magnetic Force Microscopy (MFM) to be superimposed on the SPM topographic image derived from the Van der Waals interaction.

Biological

The coating or functionalisation of the tip can result in a specific interaction with the surface to either image the distribution of a given species or to manipulate it, e.g. for protein unfolding studies, cell membrane manipulation and the measurement of properties such as elasticity.

Hollow Tips

Despite decreasing the resolution, a hollow tip would allow the delivery of light, biomolecules, reagents and fluids.

Nanolithography

Patterning and manipulation of the surface can be achieved using a number of approaches including, but not limited to, oxidation, scratching and deposition.

Nanoindentation

Mechanical testing of materials and coatings using nanoindentation, applying force and adding modules for hardness and wear testing using, for example Berkovitch, cube corner and spherical indentation can be done.

Force Curves

Due to the force induced phase displacement which occurs as the probe tip approaches the surface, force-distance curves can be constructed which allow the measurement of, for example, elasticity, mechanical stimulation and protein unfolding of softer materials than for nanoindentation.

The invention claimed is:

1. A scanning probe microscope for imaging a sample surface, the microscope comprising an elongate probe having a longitudinal axis oriented substantially orthogonal to the sample surface, the probe having a tip, a driver and a compliant elastic module disposed between the driver and the tip, the driver being adapted to axially oscillate the tip and wherein the elastic module has a tapering cross-section along its length towards the tip.

2. A scanning probe microscope according to claim 1, wherein the module solely transmits oscillations externally applied by the driver.

3. A scanning probe microscope according to claim 1, wherein the elastic module includes a spring, an elastomeric member or a fluid filled tube.

4. A scanning probe microscope according to claim 1, wherein the driver includes piezo-electric, magneto-constrictive or electromagnetic drive means.

5. A scanning probe microscope according to claim 1, further comprising means for controlling the axial position of the probe relative to the surface.

6. A scanning probe microscope according to claim 5, wherein the axial position control means is adapted to maintain the probe tip at a predetermined distance above the surface.

7. A scanning probe microscope according to claim 5, wherein the axial position control means includes means for monitoring the axial position of the tip.

8. A scanning probe microscope according to claim 5, wherein the axial position control means includes means for monitoring the axial position of the tip and the monitoring means includes optical or electromagnetic feedback.

9. A scanning probe microscope according to claim 1, further comprising means for controlling the axial position of the probe relative to the surface wherein the axial position control means includes means for monitoring the axial position of the tip and the monitoring means is adapted to detect phase difference between the frequency of oscillation of the driver and probe tip, due to interaction of the tip with surface forces.

10. A scanning probe microscope according to claim 9, adapted to axially oscillate the probe tip at a frequency in the range of 0 to 100,000 kHz.

\* \* \* \* \*